United States Patent

Corder

[15] 3,696,496
[45] Oct. 10, 1972

[54] EXTRACTOR AND PUSHER
[72] Inventor: Joe B. Corder, 3802 Cossell Road, Indianapolis, Ind. 46222
[22] Filed: Dec. 21, 1970
[21] Appl. No.: 99,745

Related U.S. Application Data

[63] Continuation-in-part of Ser. No. 811,309, March 28, 1969, abandoned.

[52] U.S. Cl. ................................................. 29/260
[51] Int. Cl. ............................................. B23p 19/04
[58] Field of Search........29/256, 257, 258, 259, 260, 29/263, 264

[56] References Cited

UNITED STATES PATENTS 2,288,906  7/1942  Kaplan ........................29/260
3,102,333  9/1963  Thornton et al. ...........29/257

*Primary Examiner*—James L. Jones, Jr.
*Attorney*—Hood, Gust, Irish, Lundy & Coffey

[57] ABSTRACT

For use in inserting and removing devices, such as ball joints, which are conventionally pressed into openings in members, an apparatus comprising rigid frame means including a frame plate adapted to be disposed on one side of such a member and a frame portion adapted to be disposed on the opposite side of such a member. The frame plate provides an opening positioned to be registrable with the opening in such a member. Drive means, such as a jacking screw, is carried by the frame portion and adapter means is provided for operatively connecting the drive means to such a device.

9 Claims, 8 Drawing Figures

PATENTED OCT 10 1972

INVENTOR
JOE B. CORDER
BY
Hood, Gust, Irish & Lundy
ATTORNEYS

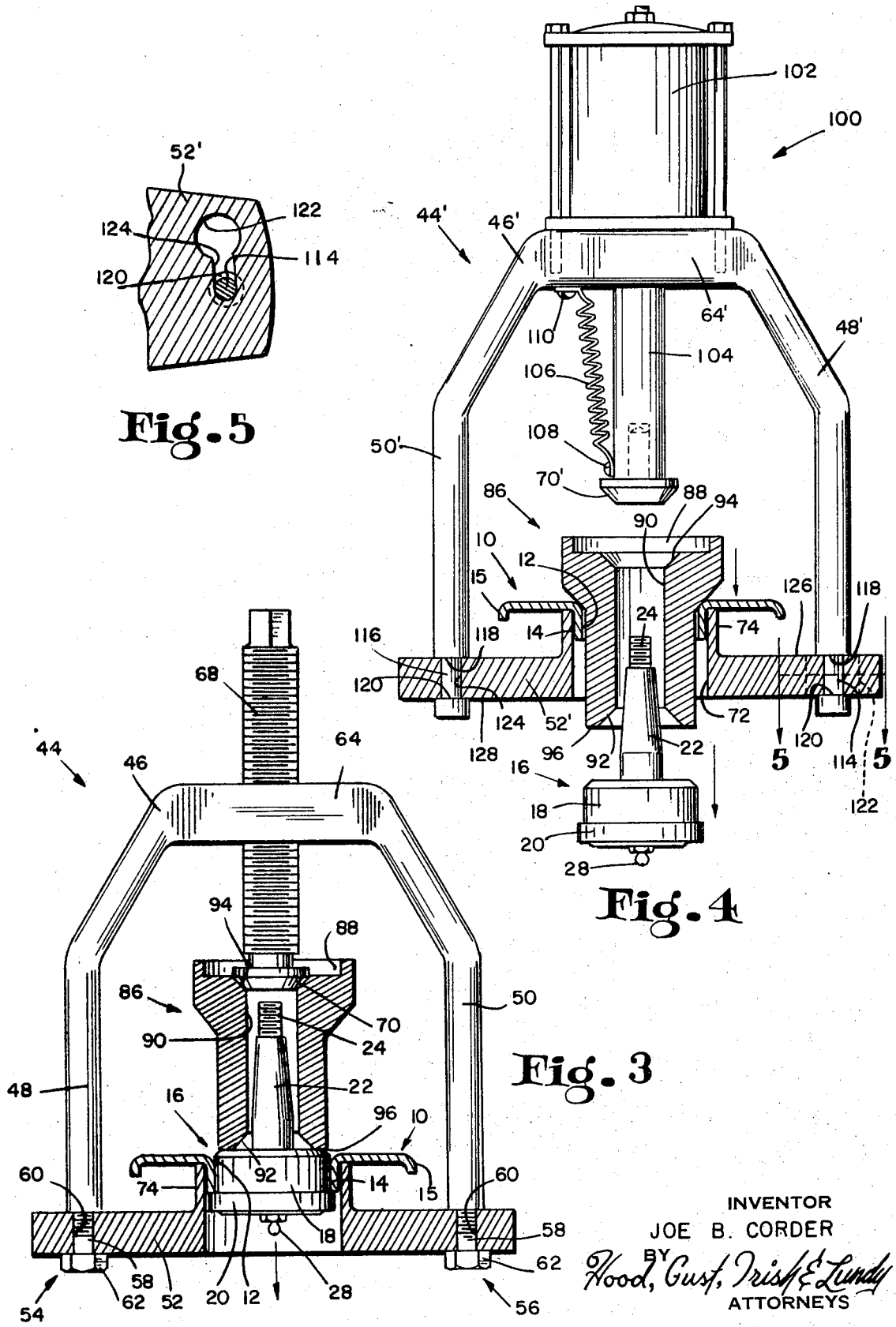

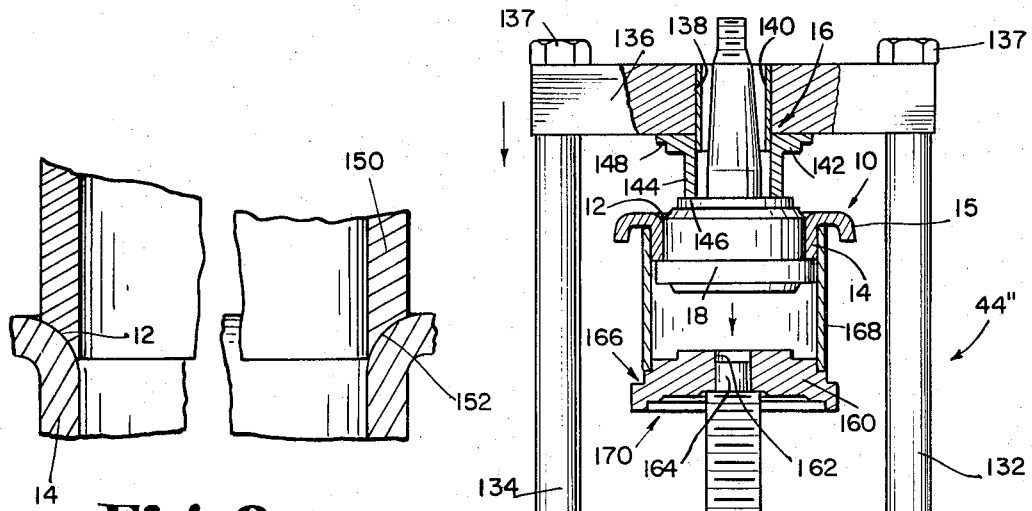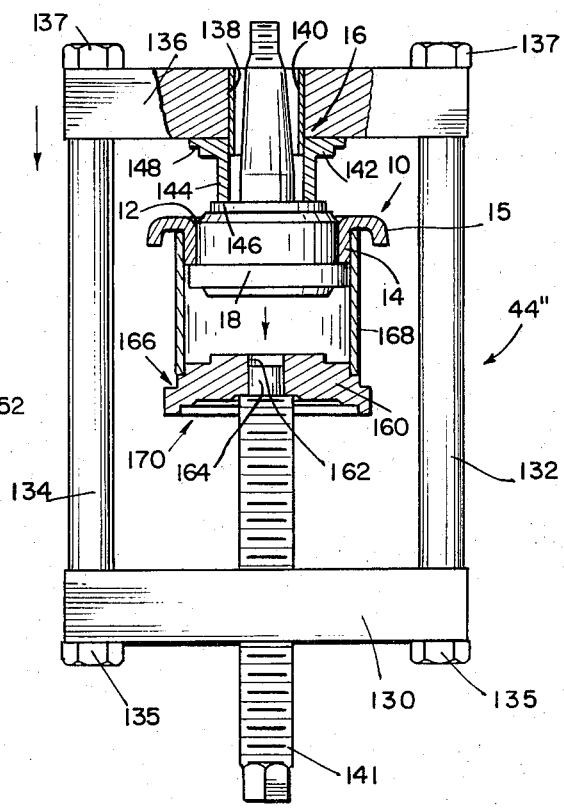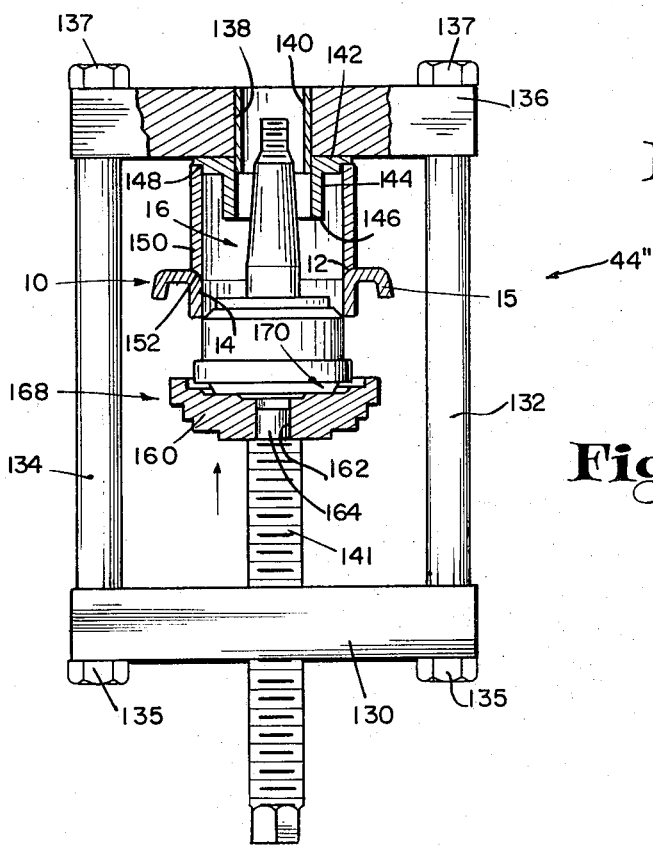

EXTRACTOR AND PUSHER

This application is a Continuation-In-Part application based on my copending application Ser. No. 811,309 filed Mar. 28, 1969, now abandoned, and titled — EXTRACTOR AND PUSHER.

It is a primary object of my invention to provide an apparatus for use in inserting and removing devices, such as ball joints, which are conventionally pressed into openings into members, such as A-frames of automobiles.

It will be appreciated by those familiar with automobile structures that, in some types of automobile, the front wheels are connected to a suspension member, commonly called an A-frame, by means of a ball joint. Such ball joints conventionally have a main body portion providing a cylindrical wall, a larger base portion and a centrally located, upwardly extending stem portion which is swivelly connected to the main body portion. A front wheel of an automobile is conventionally connected to this stem portion by a member which comprises a portion of the steering and suspension system for the wheel. Further, conventionally, A-frames are provided with flanged openings into which the ball joints are pressed. Specifically, the ball joints are pressed upwardly into the flanged openings with the cylindrical wall of the ball joint main body portion engaging tightly the internal wall of the flanged opening and with the base portion of the ball joint engaging the lower peripheral edge of the flange about the opening.

In manufacturing new automobiles, ball joints are assembled to A-frames before the A-frames are connected to the frame of the automobile. This assembly operation may, of course, be accomplished utilizing heavy-duty hydraulic presses and the like. In the past, after an automobile has been driven for a period of years and the ball joints in its steering and suspension system have become worn to the point where they must be replaced, it has been rather difficult to remove the ball joints and to replace them with new ones. Conventionally, mechanics have removed the A-frames from automobiles and have used hammers to knock the old ball joints out of their respective openings in the A-frames. It is my understanding that some mechanics have put new ball joints back into the A-frames by beating on them with hammers. That is, the mechanics have been providing a press fit between a new ball joint and an A-frame by driving, with a hammer, the ball joint into its opening in the A-frame. Such treatment of a ball joint is likely to damage it.

It is an object of my invention, therefore, to provide an apparatus for removing and replacing devices, such as ball joints, which are pressed into openings, which apparatus is simple in structure, but yet, effective for the purpose intended. My apparatus is so proportioned and designed that it can be used to remove a worn ball joint from an A-frame and then to insert a new ball joint into the A-frame without disassembling the A-frame from the automobile on which it is mounted. This, of course, reduces the amount of time required for replacing a ball joint.

My apparatus is so constructed that it will press a ball joint into its opening in an A-frame without, in any way, damaging the ball joint or the A-frame. Specifically, my apparatus comprises an adapter means for operatively connecting the driver of my apparatus to a ball joint, the adapter means providing a socket for seating the base portion of the ball joint as it is being driven into its opening in an A-frame. In the preferred form of my invention, the adapter means is a reversible member, one end of which provides the socket for seating the base portion of a ball joint which is being pressed into its opening and the other end of which provides a portion for engaging the ball joint to drive it out of its opening.

My apparatus comprises rigid frame means providing a first frame portion adapted to be disposed above an A-frame and a second frame portion adapted to be disposed below the A-frame, the first frame portion providing an opening positioned to be registrable with the opening in the A-frame into which the ball joint is pressed. Drive means, such as a jacking screw or a hydraulic ram, is carried by the second frame portion and adapter means is provided for operatively connecting the drive means to the ball joint, the adapter means providing a socket for seating the base portion of the ball joint. The frame portions of one embodiment of my apparatus are reversible with the first frame portion being adapted to be disposed below the A-frame and the second frame portion being adapted to be disposed above the A-frame, in which case, the drive means carried by the second frame portion can be used to drive a ball joint out of its opening in the A-frame. One of my preferred adapter means provides a sleeve portion arranged to fit down over the stem portion of a ball joint to engage and push downwardly against the main body portion of the ball joint.

One embodiment of my apparatus includes an alignment member which is mounted for reciprocation in an opening in the first frame portion in the direction of an axis coinciding with the direction of movement of the drive means, the alignment member being proportioned and arranged to extend into and to engage the ball joint opening in an A-frame to align the apparatus with the opening so that the ball joint will be driven properly into its opening. Another embodiment of my apparatus includes an alignment member which is mounted on the first frame portion to extend into and conformingly engage the upper radiused edge of the ball joint opening in an A-frame.

In one form of my apparatus, the first frame portion is a frame plate having an opening therein which is disposed to be registrable with the opening in an A-frame into which a ball joint is pressed. In this form of the invention, preferably, the second frame portion provides a pair of spaced apart legs arranged to receive therebetween the portion of an A-frame having a ball joint opening therein, the frame plate being connected to the distal ends of the legs. Further, preferably, each of the legs is provided with a reduced portion spaced inwardly from and adjacent its distal end and the frame plate is provided with slots which snugly engage, respectively, the reduced portions of the legs. These slots extend into larger openings through which the legs can extend so that the frame plate can be connected to the second frame portion by engaging the reduced portions of its legs respectively into the slots in the frame plate.

Other objects and features of the present invention will become apparent as this description progresses.

To the accomplishment of the above and related objects, my invention may be embodied in the forms illustrated in the accompanying drawings, attention being called to the fact, however, that the drawings are merely illustrative and that changes may be made in the specific constructions illustrated and described, so long as the scope of the appended claims is not violated.

In the drawings:

FIG. 3 is a sectional view showing my apparatus being used to push a ball joint out of its opening in an A-frame;

FIG. 4 is a sectional view showing another embodiment of my apparatus being used to push a ball joint out of its opening in an A-frame;

FIG. 5 is a fragmentary sectional view taken from FIG. 4 generally along the line 5—5;

FIG. 6 is a partially sectioned view showing another form of my apparatus being used to push a ball joint out of its opening in an A-frame;

FIG. 7 is a partially sectioned view showing the apparatus of FIG. 6 being used to press a ball joint into an opening in an A-frame; and FIG. 8 is an enlarged fragmentary sectional view showing how the alignment member of the apparatus of FIGS. 6 and 7 conformingly engages the radiused upper edge of a ball joint opening in an A-frame.

Figures 1, 2:
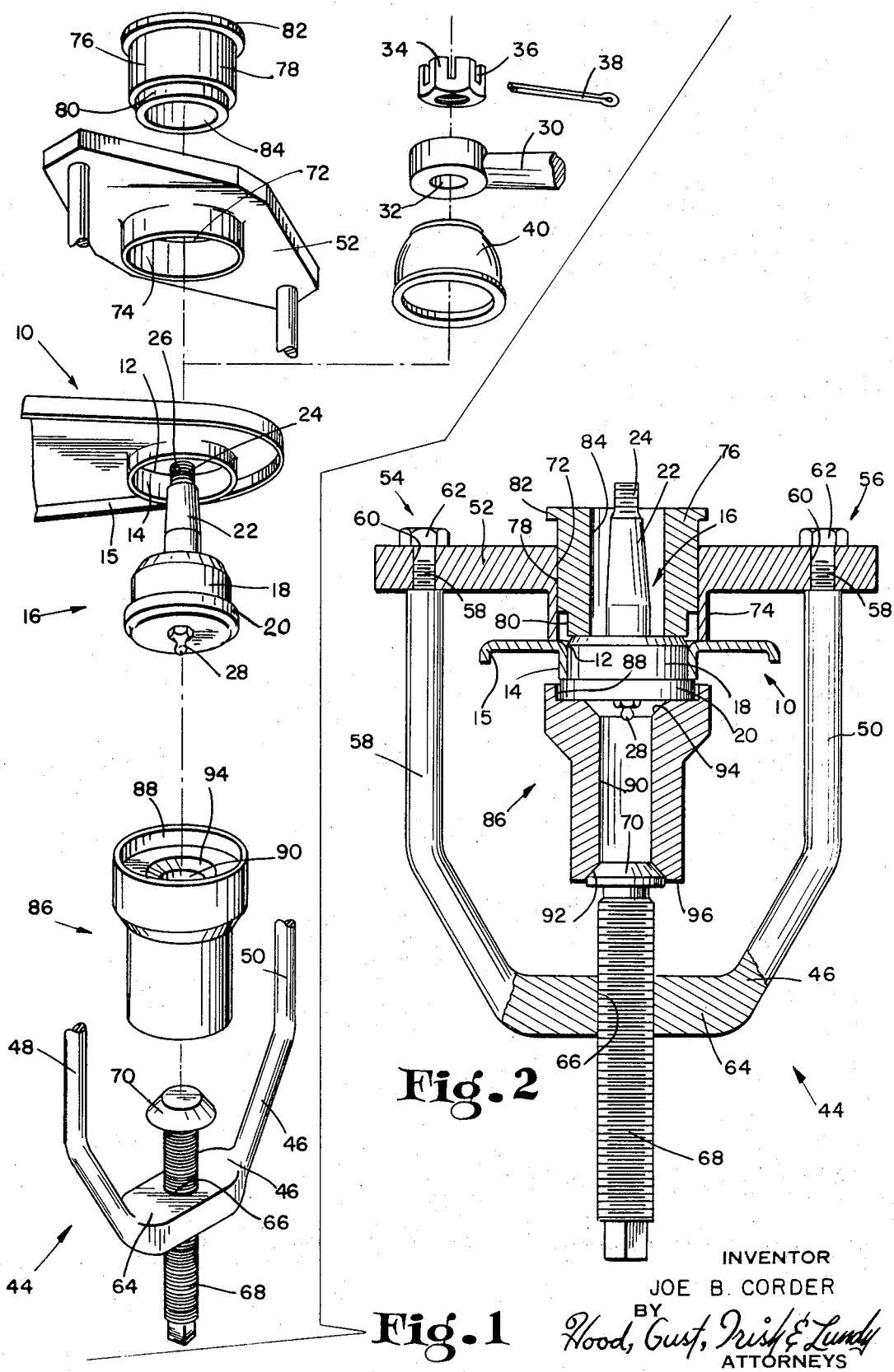
FIG. 1 is an exploded perspective view showing a portion of an A-frame, a ball joint, and my apparatus for pressing the ball joint into its opening in the A-frame.
FIG. 2 is an enlarged sectional view showing my apparatus pushing or pressing a ball joint into an A-frame.

Referring now to the drawings, and particularly to FIG. 1, it will be seen that I have illustrated the distal end portion of an A-frame 10, which portion is provided with a circular opening 12 about which a downturned flange 14 peripherally extends. It will be appreciated that the opening 12 and the flange 14 are punched into the A-frame 10 using conventional sheet-metal forming techniques. The flange 14, of course, strengthens the A-frame 10 in the area of its opening 12. The A-frame 10 is also provided with a perimetral flange 15 for strengthening purposes.

I have also illustrated a conventional ball joint 16 including a main body portion 18 providing a cylindrical outer wall and a larger base portion 20 and a centrally located, upwardly extending stem portion 22. Conventionally, of course, the stem portion 22 is swivelly connected to the main body portion 18. The upper end portion of the stem 22 is threaded as indicated at 24 and a transaxially extending opening 26 is provided in this portion. Further, a grease fitting 28 is provided so that grease can be injected into the main body portion to lubricate the ball joint. Conventionally, an arm 30 is rigidly connected to the stem portion 22 of the ball joint 16, the illustrated arm 30 having an opening 32 which receives the stem portion. A nut 34 which is slotted as indicated at 36 is threaded onto the threaded portion 24 of the stem to hold the arm 30 securely thereto. In order to prevent the arm 30 from being disconnected from the stem portion 22, a conventional pin 38 is extended through diametrically opposing slots 36 in the nut 34 and the opening 26 in the threaded portions 24. Also, conventionally, a rubber or rubber-like dust cover or cup 40 is placed over the ball joint and under the enlarged portion of the arm 30.

The structure of the ball joint 16 is conventional and well known in the automotive arts and the structure of the A-frame 10 is likewise conventional and well known.

The cylindrical outer wall of the main body portion 18 of the ball joint 16 is designed to be press fitted into the flanged opening 12. That is, conventionally, the ball joint 16 is assembled to the A-frame 10 by pressing the ball joint upwardly into the flanged opening 12. The upper peripheral edge of the base portion 20 engages the lower peripheral edge of the flange 14 when the ball joint 16 is properly assembled in the A-frame 10. It will be appreciated that this engagement of the base 20 with the flange 14 is effective to secure the ball joint 16 against vertical movement relative to the A-frame 10 after the ball joint is properly assembled.

Referring now particularly to FIGS. 1, 2 and 3, one embodiment of my apparatus will be discussed. This embodiment comprises a frame or frame means 44 including a frame portion 46 having spaced apart legs 48, 50 and another frame portion or frame plate 52 which is connected to the distal ends of the legs as indicated at 54, 56. Specifically, the distal end portion of each leg 48, 50 is reduced and threaded as indicated at 58 to extend through an opening 60 in the plate 52 and a nut 62 is threaded onto the reduced portion. The frame plate 52 and frame portion 46 provide a rigid frame means. The central portion 64 of the frame portion 46 is provided with a threaded opening 66 into which a jacking screw 68 is threadedly engaged. This screw 68 is preferably rotatable about an axis which extends between and lies in a plane including the centers of the legs 48, 50. As best viewed in FIGS. 2 and 3, the frame portion 46 and the frame plate 52 is symmetrical with respect to the rotational axis of the screw 68. The screw 68 carries a conically tapered head 70 as will be more full discussed hereinafter.

The frame plate 52 is provided with a circular opening 72, the center of which coincides with the axis of the jacking screw 68. The opening 72 is preferably large enough to receive the base portion 20 of the ball joint 16 as illustrated in FIG. 3. Also, preferably, a flange 74 which extends peripherally about the opening 72 and axially toward the jacking screw 68 is provided on the frame plate 52. This flange 74, which must be quite rigid, and the opening 72 defines a bore in which an alignment member 76 is carried for axial reciprocation.

The alignment member 76 is provided with a first cylindrical wall portion 78 having a diameter which is preferably just a few thousandths of an inch less than the diameter of the opening 72 including the internal diameter of the sleeve provided by the flange 74. The member 76 is also provided with a second cylindrical wall portion 80 the diameter of which is preferably just a few thousandths of an inch less than the diameter of the opening 12 in the A-frame 10 as well as the internal diameter of the sleeve provided by the flange 14. As illustrated, the member 76 is also provided with an enlarged upper rim 82 which limits the downward movement of the member relative to the frame plate 52 as viewed in FIG. 2. Thus, the alignment member may be dropped into the frame plate 52 as illustrated in FIG. 2 so that its cylindrical portion 80 will extend below the lower peripheral edge of the flange 74 to extend into and to engage the opening 12 in the A-frame 10, thereby to align the frame means 44 to the opening 12. When a ball joint 16 is pressed upwardly into the opening 12, the alignment member 76 moves upwardly out of the opening.

As best seen in FIG. 2, the alignment member 76 is provided with a centrally located bore 84 for receiving the upwardly extending stem portion 22 of the ball joint 16.

It will be appreciated that the reciprocable alignment member 76 will serve as a means for quickly and easily aligning the frame means 44 with the opening 12 in an A-frame 10 so that the ball joint 16 can be properly pressed into the opening 12, i.e., so that the ball joint 16 can be properly aligned with the opening 12 before it is pressed upwardly to engage the opening. It will be remembered that my apparatus is proportioned and designed so that a mechanic can press a ball joint upwardly into the opening in an A-frame without removing it from the automobile on which it is mounted. The alignment member 76, which functions to position the frame means 44, permits the mechanic quickly and easily to align the frame means 44. It will be appreciated that, when a ball joint 16 is pressed out of its opening 12 in an A-frame 10, the opening 12 will be left quite clean. The reduced portion 80 of the member 76 can then engage this clean opening to position the frame means 44.

It will be observed in FIG. 2 that the lower peripheral edge of the flange 74 engages the upper surface of the A-frame 10 peripherally about the opening 12. In many A-frames, the upper surface is flat only for a short radial distance peripherally about the opening 12 therein. Thus, the lower edge of the flange 74 engages this conventionally flat surface. Additionally, A-frames which have been used on automobiles for a period of time will become extremely dirty and the outer surfaces thereof will be covered with dirt, rocks, tar and the like. The area extending peripherally about the opening 12 will, of course, be kept clean by the cup 40 illustrated in FIG. 1. Thus, the lower peripheral edge of the flange 74 will engage this clean flat surface uniformly.

In the drawings, I have illustrated an adapter or adapter means 86 for operatively connecting a ball joint 16 to the drive means of my apparatus. The illustrative adapter 86 is formed, at one end, to provide a cylindrically shaped socket 88 for seating the base portion 20 of a ball joint as best seen in FIG. 2. The adapter 86 is also formed with a centrally located, axially extending bore 90 and, at each end of this bore, a conically shaped recess 92, 94. These recesses 92, 94 are conically shaped to conform to the conical taper of the head 70 so that either end of the adapter 86 can be placed on the head 70. It will be appreciated that these conically shaped recesses 92, 94 provide bearing surfaces permitting or facilitating rotation of the screw 68 relative to the adapter 86. Of course, the engagement of the conically tapered head 70 into one of the conically shaped recesses 92, 94 aligns the adapter 86 with the axis of the screw 68. The cylindrically shaped socket 88 is, of course, preferably concentric with the axis of the bore 90 and the recesses 92, 94 so that, when a ball joint is placed into the socket 88 as illustrated in FIG. 2, the ball joint will be aligned with the axis of the screw. It will be remembered that the axis of the screw 68 is coincident with the center of the opening 72 in which the alignment member 76 is reciprocably carried.

When the adapter 86 is oriented as viewed in FIG. 2, it can be used to press a ball joint 16 upwardly into its opening 12. When my apparatus is used to press a ball joint 16 out of its opening 12, the adapter 86 is reversed as shown in FIGS. 3 and 4. Specifically, when the adapter 86 is used to press a ball joint 16 upwardly into its opening 12, the ball joint base 20 is placed into the socket 88 and the conically shaped recess 92 is engaged with the head 70. When the adapter 86 is used to press a ball joint out of its opening, its end 96 adjacent the recess 92 is engaged with the main body portion 18 of the ball joint with its bore 90 receiving the stem portion 22 of the ball joint and with its conically shaped recess 94 engaging the head 70.

Referring now particularly to FIG. 3, it will be seen that, when my apparatus is used to press a ball joint 16 out of its opening 12, the frame plate 52 is disposed below the A-frame 10 with the flange 74 peripherally enclosing the flange 14 of the A-frame and the frame portion 46 disposed above the A-frame. The engagement of the flange 14 within the flange 74 aligns the jacking screw 68 with the opening 12 in which the ball joint 16 is disposed. Thus, the engagement of the conically tapered head 70 into the conically shaped recess 94 aligns the adapter 86 so that its end 96 will concentrically engage the main body portion 18 of the ball joint. Thus, advancement of the screw 68 toward the plate 52 will push the ball joint 16 out of its opening 12. Since the flange 74 engages the A-frame 10 concentrically with respect to the opening 12 and since the ball joint 16 is pressed axially downwardly, there will be no tendency to warp or bend the A-frame 10 by the act of removing the ball joint 16.

Referring now to FIGS. 4 and 5, another embodiment of my apparatus will be discussed. In this discussion, like reference numerals represent like parts. There is illustrated a drive means 100 including a fluid motor 102, which may be a hydraulic cylinder, mounted on the central portion 64' of the frame portion 46', the motor having a piston rod 104 arranged for reciprocation along an axis which coincides with the axis defined by the opening 72 and cylindrical flange 74 of the frame plate 52'. The conically tapered head 70' carried by the distal end of the piston rod 104 is concentric with the axis defined by the opening 72 and the flange 74. As illustrated, a spring 106 may be provided for yieldably urging the piston rod 104 to its retracted position, the spring being connected to the piston rod as indicated at 108 and to the frame means 44' as indicated at 110. Pump means, not shown, must be provided for use with the fluid motor 102. That is, conventionally, fluid must be pumped into the motor 102 to force the piston rod 104 toward the frame plate 52'.

The frame plate 52' is removably connected to the frame portion 46' without the use of fastening elements. Specifically, each of the legs 48', 50' is provided with a cylindrically shaped reduced portion spaced inwardly from and adjacent its distal end, each reduced portion providing a cylindrical shank 114, 116 having a peripherally and radially outwardly extending bearing surface 118, 120 at each of its ends. Further, the frame plate 52', which is generally flat, is provided with second openings 122 through which, respectively, the distal end portions of the legs 48', 50' can extend and an elongated slot 124 extending away from each of these openings 122. Each slot 124 has opposing walls proportioned and designed snugly to engage the shank 114, 116 of the leg 48', 50', extending through the second opening 122 into which the slot opens. As best seen in FIG. 4, the frame plate 52' is provided with opposing surfaces 126, 128 adjacent each slot 124 engageable, respectively, with the bearing surfaces 118, 120 at the ends of the shank 114, 116 engageable in the slot. Thus, the frame plate 52' is rigidly connected to the frame portion 46' by extending the legs 48', 50', respectively, into the second openings 122 and then moving the shanks 114, 116, respectively, into engagement with the slots 124.

The slots 124 are arcuately formed about an axis which coincides generally with the axis defined by the opening 72 and the flange 74, whereby the movement of the shanks 114, 116, respectively, into engagement with the slots 124 is a twisting movement about the axis. The snug engagement of the shanks 114, 116 in the slots 124 and the engagement of the flat surfaces 126, 128, respectively, with the bearing surfaces 118, 120 at the ends of the shanks holds the frame plate 52' securely to the frame portion 46'.

The above-described method of connecting the frame plate 52' to the frame portion 46' is advantageous because, in some cases, it is more facile to separate the frame portion 46' from the frame plate 52' and then to place the frame portion 46' above an A-frame 10 and to place the frame plate 52' below the A-frame before the two parts are rigidly connected together.

While the FIG. 4 embodiment of my apparatus is illustrated in a position in which it is used to press a ball joint 16 out of its opening 12, it will be appreciated that the same apparatus can be reversed in position to be used to press a new ball joint back into the opening 12. In the illustration of FIG. 4, the ball joint 16 is shown falling out of the opening 12 and the adapter 86 is shown in the position it will be in after the ball joint does fall out of its opening 12. That is, once the ball joint drops out of its opening 12, the adapter 86 will drop into the opening.

Turning now to FIGS. 6, 7 and 8, another embodiment of my apparatus, indicated generally by the reference numeral 44'', will be discussed. This embodiment comprises a rigid frame provided by a frame member 130, from each side of which extends rigid legs 132, 134. These legs 132, 134 may be rigidly secured to the frame member 130 by means such as the illustrated nuts 135. The distal ends of the legs 132, 134 are rigidly fastened together by a rigid frame plate 136 and by means such as the illustrated nuts 137.

The frame plate 136 is provided with a centrally located opening 138 which, in the illustrative embodiment, is provided with a bushing 140 having a length greater than the thickness of the plate 136. A jack screw 141 is threadedly engaged with the frame member 130 and positioned to be rotatable about an axis which is coincident with the axis of the opening 138 as discussed previously in conjunction with the apparatus of FIGS. 1–3.

The lower end of the bushing 140 extends below the lower surface of the plate 136 and into the bore of a member 142 which I use as a connector or locater member and as a pusher member. Particularly, the member 142 is provided with a rigid and concentric sleeve portion 144 defining a peripherally extending lower edge 146 which is concentric with the axis of the opening 138 and which, as illustrated in FIG. 6, pushes downwardly against the main body portion 18 of a ball joint in the extracting process.

The member 142 is provided with a peripherally extending rabbet 148 as illustrated which serves as a locating seat for a sleeve-like alignment member 150. This alignment member 150 is not reciprocable relative to the frame plate 136 as discussed previously in conjunction with the alignment member 176 and the frame plate 52. The alignment member 150 is provided with an internally radiused peripherally extending lower edge 152 which conformingly engages the externally radiused peripherally extending edge of the opening 12 in the A-frame 10. This conforming engagement is best seen in the enlarged fragmentary sectional view of FIG. 8.

The apparatus 44'' also includes an adapter 160 which is usable to extract ball joints as well as to insert ball joints. The generally cylindrically shaped adapter 160 is provided with a concentric bore 162 which receives and rotates on the upper, reduced end portion 164 of the jacking screw 141. One side, i.e., the upper side in FIG. 6, of the adapter 160 is rabbeted to provide a plurality of peripherally extending steps 166, each of which is proportioned and designed to locate a rigid sleeve such as indicated at 168. The other side of the adapter 160, i.e., the upper side in FIG. 7, is provided with a plurality of concentrically arranged seats 170 for locating the base portion of a ball joint.

One advantage of the apparatus 44'' is that it can be used as an extractor and a pusher of ball joints without having to reverse the positions of the jacking screw 141 and the frame plate 136. Particularly, the jacking screw 141 is advanced upwardly to extract a ball joint and it is also advanced upwardly or rotated in the same direction to press a ball joint into an A-frame.

Turning to FIG. 6, it will be seen that the extracting process involves placing the adapter 160 as illustrated with a rigid sleeve 168 disposed between the adapter and the A-frame and with the upper end of the sleeve 168 receiving the down-turned flange 14. In the extracting process, the lower peripherally extending edge 146 of the member 142 moves with the plate 136 downwardly relative to the A-frame when the screw jack 141 is advanced.

Turning now to FIG. 7, it will be seen that the adapter is inverted to locate and support the base of a ball joint relative to the frame plate 136. Then, the frame plate 136 is accurately aligned to the opening 12 in the A-frame by the alignment member 150. It will be appreciated that the alignment member does not extend into the opening 12 in the A-frame such that it must move in order for the main body portion of the ball joint to enter that opening. In the arrangement of FIG. 7, when the screw jack 141 is advanced, the ball joint is pressed upwardly into the opening in the A-frame.

It will be appreciated that I may provide members 142 and 150 to accommodate the various sizes of ball joint openings in A-frames.

What is claimed is:

1. For use in replacing ball joints which are conventionally pressed upwardly into openings in A-frames of automobiles, such openings conventionally having radiused peripherally extending upper edges, such ball joints having a main body portion providing a cylindrical wall, a larger base portion and a centrally located, upwardly extending stem portion, an apparatus comprising rigid frame means providing a first frame portion adapted to be disposed above such an A-frame and a second frame portion adapted to be disposed below such an A-frame, said first frame portion providing a first opening positioned to be registrable with the opening in such an A-frame, said first opening being large enough to pass therethrough at least part of the stem portion of such a ball joint, drive means carried by the second frame portion, adapter means arranged operatively to connect said drive means to such a ball joint, said adapter means providing a socket for seating the base portion of such a ball joint, and an alignment member mounted on said first frame portion, said alignment member being proportioned and designed to engage the ball joint opening in such an A-frame axially to align said frame means with such an opening, said alignment member being provided with a centrally located axially extending opening for receiving the stem portion of such a ball joint.

2. The apparatus of claim 1 in which said alignment member is carried in said first opening for reciprocation in the direction of an axis coinciding with the direction of movement of said drive means, said alignment member being proportioned and designed to extend into and concentrically to engage the ball joint opening in such an A-frame, whereby when such a ball joint is pushed upwardly into such an opening, the alignment member is moved by the ball joint upwardly out of the opening.

3. The apparatus of claim 1 in which said frame portions are reversible with said first frame portion being adapted to be disposed below such an A-frame and said second frame portion being adapted to be disposed above such an A-frame, said adapter meaNs providing a sleeve portion arranged to fit down over such a stem portion, a peripherally extending rim at one end of said sleeve portion arranged to engage and push downwardly against the main body portion of such a ball joint and said socket for seating the base portion of such a ball joint at the other end of said sleeve portion.

4. The apparatus of claim 2 in which said frame portions are reversible with said first frame portion being adapted to be disposed below such an A-frame and said second frame portion being adapted to be disposed above such an A-frame, said adapter means providing a sleeve portion arranged to fit down over such a stem portion, a peripherally extending rim at one end of said sleeve portion arranged to engage and push downwardly against the main body portion of such a ball joint and said socket for seating the base portion of such a ball joint at the other end of said sleeve portion.

5. The apparatus of claim 1 in which said second frame portion provides a pair of spaced apart legs arranged to receive therebetween such an A-frame, said first frame portion including a frame plate connected to the distal ends of said legs, in which each of said legs is provided with a reduced portion spaced inwardly from and adjacent its distal end, and in which said frame plate is provided with second openings through which, respectively, the distal end portions of said legs can extend and an elongated slot extending away from each second opening, each slot being proportioned and designed snugly to engage the reduced portion of the leg extending through the second opening into which said slot opens, whereby said frame plate is connected to said frame portion by extending said legs respectively into said second openings and then moving said reduced portions respectively into engagement with said slots.

6. The apparatus of claim 5 in which said slots are arcuately formed about the same general axis whereby the movement of said reduced portions respectively into engagement with said slots includes a twisting movement generally about said axis.

7. The apparatus of claim 1 in which said alignment member is formed to provide an internally radiused peripherally extending lower edge proportioned and designed conformingly to engage the radiused upper edge of such a ball joint opening.

8. The apparatus of claim 1 in which said alignment member is a rigid sleeve-like member having an upper peripherally extending edge and a lower peripherally extending edge, said lower peripherally extending edge being radiused conformingly to engage the radiused upper edge of such ball joint opening in an A-frame.

9. The apparatus of claim 8 including a locater member mounted on said first frame portion, said locater member being proportioned and designed to mate with the upper peripherally extending edge of said alignment member to hold said alignment member concentric with said first opening.

* * * * *